United States Patent [19]

Grant

[11] Patent Number: 4,941,059

[45] Date of Patent: Jul. 10, 1990

[54] METHOD FOR RESTORING COMPUTER FILES, INCLUDING IMPROVED STEPS FOR LOCATION OF HEAD CLUSTERS OF FILES

[75] Inventor: David L. Grant, Houston, Tex.

[73] Assignee: Compaq Computer Corporation, Houston, Tex.

[21] Appl. No.: 243,784

[22] Filed: Sep. 13, 1988

[51] Int. Cl.⁵ .............................................. G06F 1/00
[52] U.S. Cl. .................................... 360/72.2; 364/200
[58] Field of Search ................ 360/72.2; 364/200, 300

[56] References Cited

U.S. PATENT DOCUMENTS 4,598,357 7/1986 Swenson et al. ..................... 364/200
4,819,156 4/1989 De Lorme et al. .................. 364/200

Primary Examiner—John H. Wolff
Attorney, Agent, or Firm—Arnold, White & Durkee

[57] ABSTRACT

A method is disclosed for restoring apparently lost files on a computer whose directory file entries have been corrupted. In particular, the method includes an improved technique for locating initial or head clusters of files. An array is initialized to indicate that each element of a file allocation table (FAT) corresponds to a head cluster. Each element of the FAT is then examined, and the array is updated to reflect accurately those elements that correspond to non-head clusters. When all elements of the FAT have been so examined, the array is scanned to build a list of head cluster numbers.

1 Claim, 4 Drawing Sheets

FILE ALLOCATION TABLE (FAT)

| | |
|---|---|
| 1 | FREE |
| 2 | FREE |
| 3 | EOF |
| 4 | 5 |
| 5 | 6 |
| 6 | 3 |
| 7 | FREE |
| 8 | FREE |
| 9 | 4 |
| 10 | FREE |

DIRECTORY ENTRY

| 9 | FILE 20 | SIZE, ETC. |
|---|---|---|

HEAD CLUSTER NUMBER

FIG.6

| | FAT Contents | FAT Head Stat | Head List |
|---|---|---|---|
| 1 | FREE | NOT_HEAD | 9 |
| 2 | FREE | NOT_HEAD | |
| 3 | EOF | NOT_HEAD | |
| 4 | 5 | NOT_HEAD | |
| 5 | 6 | NOT_HEAD | |
| 6 | 3 | NOT_HEAD | |
| 7 | FREE | NOT_HEAD | |
| 8 | FREE | NOT_HEAD | |
| 9 | 4 | HEAD | |
| 10 | FREE | NOT_HEAD | |

METHOD FOR RESTORING COMPUTER FILES, INCLUDING IMPROVED STEPS FOR LOCATION OF HEAD CLUSTERS OF FILES

BACKGROUND OF THE INVENTION

This invention relates to a method for restoring computer files when their file directories have been corrupted.

File Organization

Referring to FIG. 1, computer files may be stored on a magnetic disk 10 consisting of one or more surfaces 12. Each surface 12 is divided into a number of physical circular rings called tracks 14 that are further divided into a number of physical segment regions called sectors 16.

Files occupy "clusters" of space on the disk 10; each cluster ordinarily comprises a fixed number of sectors 16 (the number depending on the type of disk being used). Typical files occupy several clusters of space on the disk 10. Each file occupies a starting or "head" cluster and an end-of-file (EOF) cluster (the two may be one and the same), and may occupy zero or more intermediate clusters.

Files need not occupy contiguous clusters on the disk 10. Each file's allocation of disk clusters must therefore be catalogued, so that reading and writing operations can be performed at the correct locations on the disk 10.

Directory Files and File Allocation Tables (FAT)

Referring to FIGS. 2 and 3, in a typical computer operating system such as the well-known MS-DOS operating system distributed by Microsoft Corporation (Bellevue, Wash.), a file allocation table (FAT) 18 and a directory file 24, each stored on the disk 10, are used to keep track of how files on the disk are allocated physically on the disk 10.

The directory file 24 contains entries for each file on the disk 10. The files' respective entries in the directory file 24 contain information such as their names, sizes, and other characteristics.

In particular, each file's entry in the directory file 24 contains the number of the head cluster of that file. This information, in conjunction with the FAT 18, can be used to trace the complete physical layout of the file on the disk.

File Allocation Table Organization

The FAT 18 is a one-dimensional array having as many elements as there are clusters on the disk 10. It is, in essence, a table having (a) a single column and (b) as many rows as there are clusters on the disk. As shown in FIG. 2, each cluster on the disk 10 thus corresponds to a unique entry in the FAT 18.

Disk files can therefore be mapped as linearly-linked lists of entries in the FAT 18, one entry per row, according to the following rules:

(1) if a cluster on the disk 10 is occupied by a part of any mapped file (i.e., if the cluster is not a free cluster), then the corresponding entry in the FAT 18 is either a pointer or an EOF marker;

(2) if a FAT entry is a pointer, the pointer points to the address (the row number) of the FAT entry corresponding to the next cluster on the disk (if any) that is occupied by the mapped file in question;

(3) if a cluster on the disk is free, its corresponding FAT entry so indicates;

(4) as noted above, the head cluster of a mapped file is not itself pointed to by any FAT entry. Instead, the number of the head cluster is stored in that file's entry in the directory file 24; and (5) the FAT entry that corresponds to the EOF cluster does not contain a pointer to another FAT record; instead, it contains a special code designating the end of the file.

Example of FAT Entries

As shown in FIG. 2, a hypothetical file 20 consists of five clusters, namely a head cluster 9; intermediate clusters 4, 5, and 6; and an EOF cluster 3. The FAT entry corresponding to the head cluster 9 points to the FAT entry corresponding to the intermediate cluster 4, which in turn points to the FAT entry corresponding to the intermediate cluster 5, which points to the FAT entry corresponding to the intermediate cluster 6, which finally points to the FAT entry corresponding to the EOF cluster 3. The FAT entry corresponding to the EOF cluster 3 does not point to any other FAT entry.

The FAT entry corresponding to the head cluster 9 is not pointed to by any other FAT entry. Instead, the head cluster's FAT record appears in that file's entry in the directory file entry 24, as shown in FIG. 3.

Any cluster not utilized by the file 20 or by any other file is represented in the FAT 18 by a zero or other indicator that the cluster is free. (Bad clusters are similarly designated by a unique indicator.)

File Corruption

When the directory entry of a file becomes corrupted, the information in the directory file entry does not accurately represent the existence of, nor the true allocation of the file, on the disk.

For example, files under MS-DOS are typically organized and catalogued in subdirectories. A subdirectory is a special file that is allocated and managed by MS-DOS with protection against erasure. It is possible that, through file system corruption, a subdirectory file can become effectively deleted. At the time this corruption occurs, however, clusters belonging to the files that are catalogued in the corrupted subdirectory may well be undamaged. These chains of clusters, represented as chains of FAT entries, may be restorable as usable files.

File Recovery

A file whose directory entry is corrupted can sometimes be recovered. The recovery process entails determining the number of the head cluster of each file being recovered. Since the head cluster is linked to the other clusters of that file in the FAT as described above (if there are any other clusters in the file; if not, then the head cluster number will contain the location of the special EOF cluster number) it is possible to recreate pointers into the data structure to access the still existing files.

SUMMARY OF THE INVENTION

In accordance with the present invention, a method is disclosed for restoring apparently lost computer files when their corresponding directory entries have been corrupted. This is accomplished in two main steps: (1) a head cluster location step, in which the head cluster of each file is located; and (2) a conventional file restoration step that utilizes the now-known head cluster number and the FAT 18 to recreate new directory file entries, causing the apparently lost files to "reappear."

The head cluster location step comprises initializing a head-status array to indicate that each element in the FAT is a head cluster.

Each element in the FAT is then examined. If the element represents a free cluster, the corresponding element in the head status array is changed to indicate that the cluster in question is not a head cluster. Similarly, if the element points to another element, the corresponding other element in the head status array is changed to indicate that the other cluster in question is not a head cluster.

By process of elimination, all elements in the head status array, except those corresponding to head clusters, are changed to indicate that the corresponding clusters are not head clusters.

Each element of the head status array is then examined. If any element corresponds to a head cluster, that element number is written to a list of head clusters. This list is then used in conventional file recovery.

The head cluster number of each file represented in the FAT is thus advantageously located in only two scanning passes.

BRIEF DESCRIPTION OF THE DRAWINGS

FIG. 6 is a schematic representation of the contents of arrays FATContents, FATHeadStat and HeadList after the head cluster location step is completed.

DETAILED DESCRIPTION OF SPECIFIC EMBODIMENTS

MS-DOS Illustration of Method

The method of the present invention is illustrated here in connection with recovering a group of files under the MS-DOS operating system. It will be understood by those of ordinary skill having the benefit of this disclosure that the illustration is not presented as a limitation on the claimed subject matter.

The method entails performing two main steps for each file being recovered: (1) a head cluster location step, namely finding the FAT entry corresponding to the head cluster of the file; and (2) a file-recovery step, namely using that FAT entry as a entry point to create a new directory entry to replace the previously corrupted directory entry, thus causing the file to "reappear" on the disk 10.

The description below is concerned with the first, head cluster location step. The second, file-recovery step is well-known to those of ordinary skill and is not described here.

Data Structures Used

The head cluster location step manipulates three arrays, typically in random-access memory (RAM): FATContents, FATHeadStat and HeadList.

The array FATContents is initialized as, in essence, a duplicate of the contents of the FAT 18. (The array FATContents is used instead of the actual FAT in order to avoid unnecessary disk-access overhead associated with searching and writing to the FAT. However, it would of course be possible to perform the method using the FAT itself.)

The array FATHeadStat indicates a particular status of each element of the FAT 18. As discussed below, the array FATHeadStat is used, not to indicate the contents of the FAT 18, but instead to indicate whether the respective individual elements of the array FATContents do, or do not, represent the head cluster of some file. This array has the same number of elements as the array FATContents (and thus as the actual FAT 18). The array FATHeadStat is initialized to indicate initially that each element in FATContents does indeed represent the head of an unknown file.

The array HeadList has an arbitrary number of elements, preferably large enough to accommodate the head-cluster numbers of as many files as are likely to be recovered. It is initialized so that each of its elements initially contains the value zero.

A variable Elt is an index into the arrays FATContents and FATHeadStat. A variable Idx is an index into the array HeadList.

Initialization

Figures 1, 2, 3:
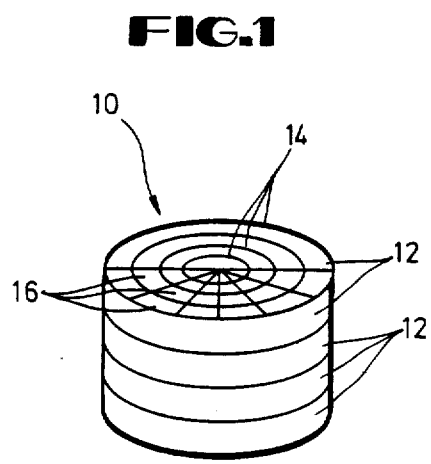
FIG. 1 is a schematic representation of a typical magnetic data storage disk.
FIG. 2 is a schematic representation of an exemplar MS-DOS File Allocation Table (FAT).
FIG. 3 is a schematic representation of an exemplar MS-DOS directory file entry.
Figure 4:
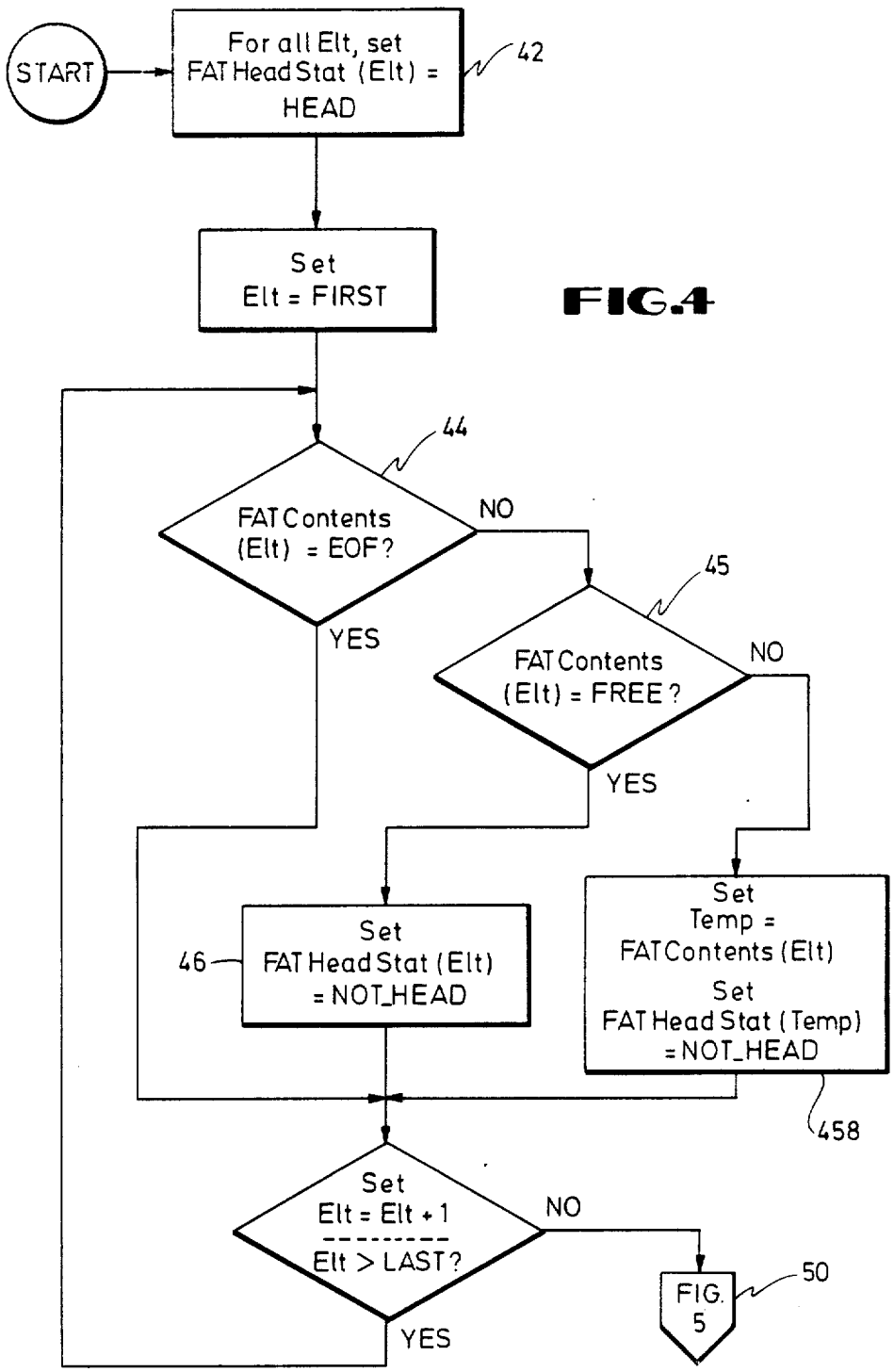
FIG. 4 is an exemplar flow chart representation of the initialization and referencing portions of the method of the present invention.

In the initialization step 42 (see FIG. 4), each element in the array FATHeadStat is initialized to a value HEAD (which may be a bit flag or other convenient representation), indicating that the corresponding clusters are all head clusters. This is in all likelihood incorrect, but it provides a convenient starting point for the method.

Head Determination

If a given element in the FAT 18 is referenced by another element, or if it corresponds to a free cluster, then it necessarily does not itself correspond to a head cluster.

Consequently, each element of the array FATContents is examined in turn. The process loop depicted by steps 44, 46, and 48 in FIG. 4 performs the examination.

If any Nth element of the array FATContents represents neither a free cluster nor an EOF cluster, it therefore represents an Nth cluster that points to an Rth intermediate cluster. The Rth cluster is not a head cluster, so the Rth element of the array FATHeadStat (not the Nth element) is therefore assigned a value NOT_HEAD (which may be a bit flag or other convenient representation).

On the other hand, if the Nth cluster of the array FATContents represents a free cluster, the Nth cluster is itself not a head, and so the Nth element of the array FATHeadStat is itself assigned the value ˙NOT_HEAD.

When all elements of the array FATContents have been examined, by process of elimination, the only elements which still have the initialization value HEAD will be those elements which in fact represent head clusters.

Figure 5:
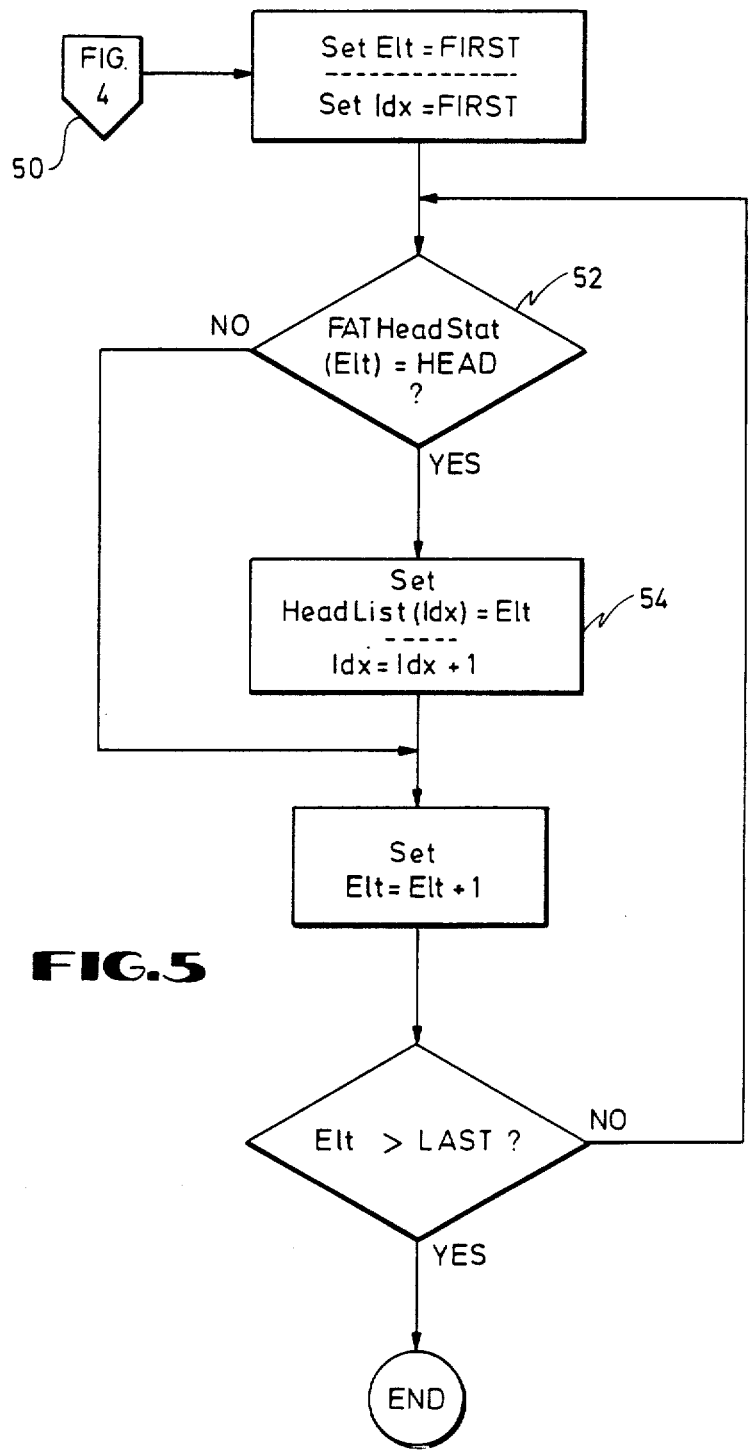
FIG. 5 is an exemplar flow chart representation of the assignment portion of the method of the present invention.

Once the determination has been made which clusters are head clusters, a second pass can be made, this time through the array FATHeadStat, to create a list HeadList of head cluster numbers. As shown in FIG. 5, this second pass entails examining each element of the array FATHeadStat and, if the element represents a head cluster, noting the element number (and thus the cluster number) in the list HeadStat. The list of head cluster numbers can then be used to create new file directory entries, etc.

It will be seen that, advantageously, each entry in the FAT 18 is "examined" (using the arrays FATContents and FATHeadStat as surrogates) only twice, once to determine which entries represent head clusters, and again to build a list of head clusters.

What is claimed is:

1. A method for determining which ones of a plurality of disk clusters comprise the respective head clusters of one or more not necessarily contiguous file sequence of said disk clusters, each said file sequence being mapped in a File Allocation Table (FAT) having a plurality of elements each corresponding to one of said disk clusters, wherein the respective value of each said element in said FAT is (i) FREE, or (ii) EOF, or (iii) a pointer to a next element corresponding to a next cluster in a one of said file sequences, said method comprising the steps of:
 (a) initializing a Head Status array, said Head Status array having the same number of elements as said FAT, to indicate that each element of said FAT corresponds to a head cluster;
 (b) for each element of said FAT that is FREE, indicating in said Head Status array that the disk cluster corresponding to said element is not a head cluster; and
 (c) for each element of said FAT that is a said pointer to a said next element, indicating in said Head Status array that the disk cluster corresponding to said next element is not a head cluster.

* * * * *